Aug. 30, 1927.

C. V. DAVIS 1,640,887

ELECTRIC WARMER AND WIPER FOR WINDSHIELDS OF AUTOMOBILES

Filed March 26, 1927

Inventor
Charles V. Davis
By Edward E. Clement
Attorney

Patented Aug. 30, 1927.

1,640,887

UNITED STATES PATENT OFFICE.

CHARLES V. DAVIS, OF MORGANTON, NORTH CAROLINA.

ELECTRIC WARMER AND WIPER FOR WINDSHIELDS OF AUTOMOBILES.

Application filed March 26, 1927. Serial No. 178,626.

My invention relates to devices for keeping windshields of automobiles clear of obstructions to the vision, and particularly to that class of devices known as windshield wipers. Such wipers usually act mechanically only, to brush or wipe the water or snow and ice from a circumscribed area of the windshield, and in severe weather or when a machine has been standing so that the windshield has accumulated a frozen coating, the mechanical wiper fails.

The object of my invention is to provide means for applying heat to the windshield and to the wiper as the latter is mechanically moved over the surface of the former, and particularly to produce a warmer which may be applied to existing wipers, or which in combination with a wiper may be applied to existing motor mechanism, and detached therefrom, as a unit.

I attain my object by mounting upon the wiper of usual type an elongated U-shaped electrical heating element having the open end of the U adjacent to the oscillating stud which carries the wiper, and the ends of the heating element attached to terminals thereat, from which wires may be conveniently run to the distributing rack of the storage battery and generator of the car. The heating element in the form in which I shall describe and illustrate it herein consists of a metal tube containing a pair of wires with suitable insulation, between the turns of which heat is communicated from the wires to the tube and from the tube to the wiper and also by radiation to the surface of the windshield. In order to prevent loss of radiant heat away from the windshield, I also provide a reflector and protector which reflects the heat toward the windshield, and prevents its radiation outwardly.

My invention is illustrated in the accompany drawings, in which

Figure 1:
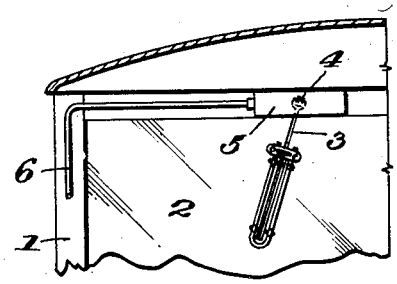
Fig. 1 is a fragmentary view of a part of the windshield with my wiper applied thereto.

Referring to the drawings, in Fig. 1, 1 represents the frame of a motor car having a windshield 2 over which a wiper arm 3 is oscillated by means of the oscillating stud 4 in the cylinder 5 connected in the usual manner to the intake of the machine by tube 6. As Fig. 1 is on a small scale, reference may be had to Figs. 2 to 6 inclusive for the wiper structure 7. This consists essentially of a metal back $7^a$ and a rubber strip $7^b$ carried thereby which is swept back and forth in an arc over the surface of the windshield 2 by the arm 3. This wiper may be of any known or other suitable construction and no novelty is claimed therefor per se. The arm 3 is secured to stud 4 detachably as by a set screw.

Figure 2:
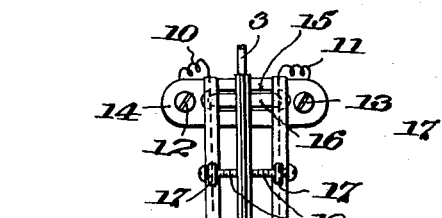
Fig. 2 is a face view of the wiper detached, without the guard.

Referring to Fig. 2, 8 designates the heating element, which as before stated, is in this case a metal tube containing an insulated heating wire 9 having its ends 10—11 connected to terminals 12—13 carried on a cross piece 14 of insulating material. This cross piece has a central slot 15 which receives a metal yoke or bridge 16 having its ends secured to the upper ends of the heating element, preferably by spot welding. The means for securing the heating element to the wiper as shown herein comprise lugs 17 secured to the two limbs of the heating elements in any suitable manner, preferably by spot welding. These lugs are in opposite pairs, and as shown carry clamping screws 18 which engage the metal frame $7^a$ of the wiper 7 on opposite sides to exert a clamping pressure thereon. In practice, these clamping screws are peferably replaced by fixed integral projections which are also secured by spot welding to the metal frame of the wiper.

From the terminals 12—13, circuit wires are led in a manner well understood in the art to the distributing rack of the electric generating system on the car, a suitable switching device being interposed in such connections to enable the heating device to be controlled by the operator.

Figure 5:
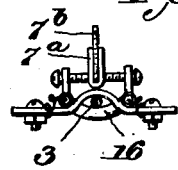
Fig. 5 is an end view of the device looking in the direction of the arrow of Fig. 4.
Figure 3:
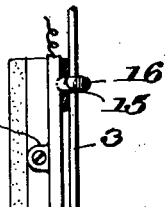
Fig. 3 is a side view of same.
Figure 4:
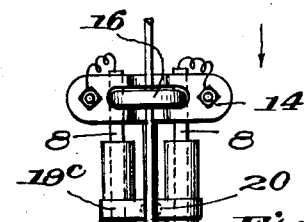
Fig. 4 is a back view of the same with the guard applied.

It will be observed in Figs. 3, 4, 5 that the wiper arm 3, which is usually a piece of steel spring wire flattened at the end, passes under the yoke or bridge 16 and over the cross piece 14. This is made particularly plain in Fig. 5 which shows the arm 3 in section. By this means additional security of fastening is obtained, with lack of vibration between the parts. Where the heating element as such is to be applied to any commercial form of wiper, the mere removal of the screw 19 and loosening of the screw 18 permits the adjustment to be made. Where the device is made up as a complete unit in the shop however spot welding is resorted to by preference.

Figure 6:
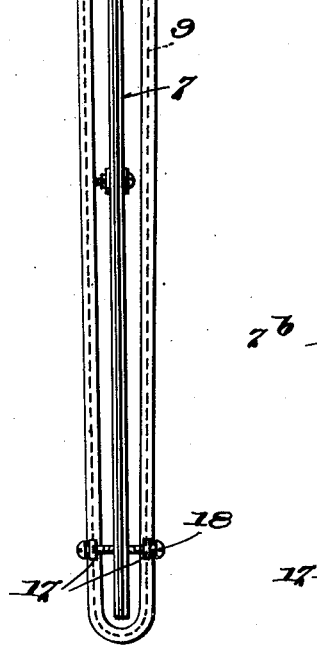
Fig. 6 is a transverse section on the line 6—6 of Fig. 4 looking in the direction of the arrows.
Figure 6:
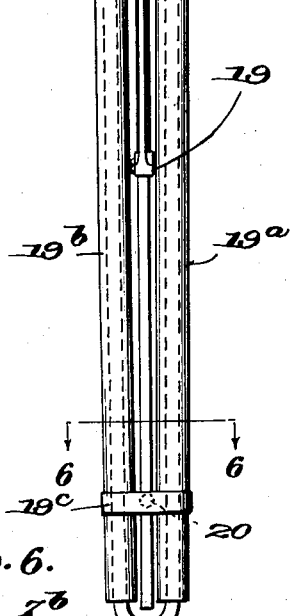

Figs. 4 and 6 show the arrangement of the reflector and protector which directs the heat toward the windshield and prevents its loss by radiation outwardly. This consists of two semi-cylindrical cover plates 19ª—19ᵇ joined by connectors 19ᶜ which cross and are spot welded to the back of the metal frame 8 as indicated at 20. Obviously, other means for securing these and other parts in position may be employed, but I have found the spot welding so satisfactory in practice that I prefer to employ it throughout, and shall claim my specific unit constructed in that way throughout.

While I have described herein a specific form of the invention, it is to be distinctly understood that I contemplate all such modifications and variations thereof as do not depart from the underlying principle of the invention, and fall fairly within the scope of the appended claims. I am aware that windshield wiper warmers have been proposed heretofore, but I believe that my heating element, applied with parallel members extending along opposite sides of the wiper and with heat conducting connections thereto, as well as means to radiate heat toward the windshield, is new and is the only practical solution of the problem that has been put forward. I shall therefore claim the same accordingly.

What I claim is:

1. A cleaner of the type described comprising a wiper strip, a rigid holder for the same, and parallel heating members extending along both sides of the wiper strip and its holder and rigidly secured to the holder.

2. The cleaner claimed in claim 1, in which the heating members are in the form of hollow tubes, with means to produce heat within said tubes.

3. The cleaner claimed in claim 1 having a protector and reflector secured on the back or outside of the heating members to cause the heat produced thereby to be radiated and reflected toward the surface with which the wiper strip is in contact.

4. The cleaner claimed in claim 1, in which the heating members constitute two legs of an elongated U-shaped element secured at points intermediate of its length to the rigid holder of the wiper strip, and having electrical heating means extending through it with insulated terminals therefor at the open ends of the U.

5. A windshield wiper constructed as a self-contained integral unit, comprising a squeegee, a rigid holder therefor, a heating element having parallel members lying on opposite sides of said rigid holder, electrical heating means extending through said heating element, insulated terminals for said electrical heating means, and means connecting its metal parts rigidly together.

6. A windshield wiper constructed as a self-contained integral unit, comprising an elastic squeegee wiper, a rigid holder therefor, a heating element having parallel members lying on opposite sides of said rigid holder, electrical heating means extending through said heating element, insulated terminals for said electrical heating means, and means connecting its metal parts rigidly together, with a reflector secured over the back or outside of the heating element, in order to prevent loss of heat therefrom.

In testimony whereof I hereunto affix my signature.

CHARLES V. DAVIS.